United States Patent
Ou

(10) Patent No.: US 8,005,522 B2
(45) Date of Patent: Aug. 23, 2011

(54) HANDHELD ELECTRONIC DEVICE

(75) Inventor: Tsung-Yuan Ou, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 378 days.

(21) Appl. No.: 12/402,490

(22) Filed: Mar. 11, 2009

(65) Prior Publication Data

US 2010/0075717 A1    Mar. 25, 2010

(30) Foreign Application Priority Data

Sep. 22, 2008   (TW) .............................. 97136347 A

(51) Int. Cl.
*H04M 1/00* (2006.01)
(52) U.S. Cl. ......... 455/575.3; D14/138 AB; 361/679.27
(58) Field of Classification Search .... 455/575.1–575.3; D14/138 AB, 345, 203.4; 16/366–369
See application file for complete search history.

(56) References Cited

U.S. PATENT DOCUMENTS

| | | | | |
|---|---|---|---|---|
| 7,272,423 B2* | 9/2007 | Satoh et al. | ............... | 455/575.3 |
| 7,907,415 B2* | 3/2011 | Ueyama | ........................ | 361/749 |
| 2007/0123319 A1* | 5/2007 | Hwang | ....................... | 455/575.1 |
| 2008/0311962 A1* | 12/2008 | Demuynck | ................. | 455/575.1 |
| 2009/0061959 A1* | 3/2009 | Cheng et al. | ............... | 455/575.3 |
| 2009/0318203 A1* | 12/2009 | Anand et al. | ............... | 455/575.3 |

\* cited by examiner

*Primary Examiner* — Don Le
(74) *Attorney, Agent, or Firm* — Jianq Chyun IP Office

(57) ABSTRACT

A handheld electronic device includes a first frame, a second frame and at least a pivot mechanism. A first connecting rod of the pivot mechanism has a first pivot part, a third pivot part and a second pivot part between them. The first pivot part is slidably disposed on a first groove of the first frame, and the third pivot part is pivoted at the second frame. A second connecting rod of the pivot mechanism has a fourth pivot part, a sixth pivot part and a fifth pivot part between them. The fifth pivot part is pivoted at the second pivot part, the fourth pivot part is slidably disposed on a second groove of the second frame, and the sixth pivot part is pivoted at the first frame for the first frame and the second frame to be opened and closed by the pivot mechanism.

14 Claims, 10 Drawing Sheets

_US 8,005,522 B2_

HANDHELD ELECTRONIC DEVICE

CROSS-REFERENCE TO RELATED APPLICATION

This application claims the priority benefit of Taiwan application serial no. 97136347, filed on Sep. 22, 2008. The entirety of the above-mentioned patent application is hereby incorporated by reference herein and made a part of specification.

BACKGROUND OF THE INVENTION

1. Field of the Invention

The present application generally relates to an electronic device, and more particularly, to a handheld electronic device.

2. Description of Related Art

In the information society today, the people's lives depend on handheld electronic devices increasingly. A handheld electronic device, such as a mobile phone or a personal digital assistant (PDA), is seen everywhere, from which it is sure the handheld electronic devices are impartible from our daily lives already. Along with the continuous progresses of the electronic science and technology, a new generation of handheld electronic devices with humanized feature and prominent functions is lunched on the market again and again.

Taking a mobile phone as an example, there are various commonly-seen mobile phones available on the current market, which include a bar-type mobile phone and a folding mobile phone (or termed as clamshell-type mobile phone). With the bar-type mobile phone, the keypad module and the display screen thereof are located on a same plane; with the folding mobile phone, the keypad module and the display screen thereof can be folded together. In comparison with the bar-type mobile phone, the folding mobile phone is advantageous in compact size and larger display screen.

In general, a folding mobile phone must have a pivot mechanism located between the keypad module and the display screen so as to connect the keypad module to the display screen and enable them to be relatively opened or closed. However, a folding mobile phone with the pivot mechanism usually would show up an exposed part of the pivot mechanism to leave an undesired look with customers. To overcome the profile problem, the manufactures need to conduct industry designs including packaging design and nice-look design on the folding mobile phone. Moreover, the exposed part of the pivot mechanism makes the figure of the folding mobile phone asymmetry.

SUMMARY OF THE INVENTION

Accordingly, the present application is directed to a handheld electronic device provided with a pivot mechanism hidden in the bodies thereof.

The present application provides a handheld electronic device, which includes a first body, a second body and at least a pivot mechanism. The first body has a first side edge and the second body has a second side edge. The first side edge is adjacent to the second side edge. The first side edge and the second side edge respectively have a first accommodation space and a second accommodation space corresponding to the first accommodation space, a first groove is disposed in the first accommodation space and a second groove is disposed in the second accommodation space. The pivot mechanism is disposed in the first accommodation space and the second accommodation space and connected between the first body and the second body. The pivot mechanism includes a first connecting rod and a second connecting rod. The first connecting rod has a first pivot part, a second pivot part and a third pivot part, wherein the second pivot part is located between the first pivot part and the third pivot part, the first pivot part is slidably disposed on the first groove and the third pivot part is pivoted on the second body. The second connecting rod has a fourth pivot part, a fifth pivot part and a sixth pivot part, wherein the fifth pivot part is located between the fourth pivot part and the sixth pivot part and pivoted on the second pivot part of the first connecting rod, the fourth pivot part is slidably disposed on the second groove, and the sixth pivot part is pivoted on the first body so as to enable the first body and the second body to relatively swing between a opened state and a folded state by means of the pivot mechanism.

The handheld electronic device of the present patent application is able to make the pivot mechanism for connecting the first body to the second body hidden by the bodies so that the invented handheld electronic device has a symmetry figure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
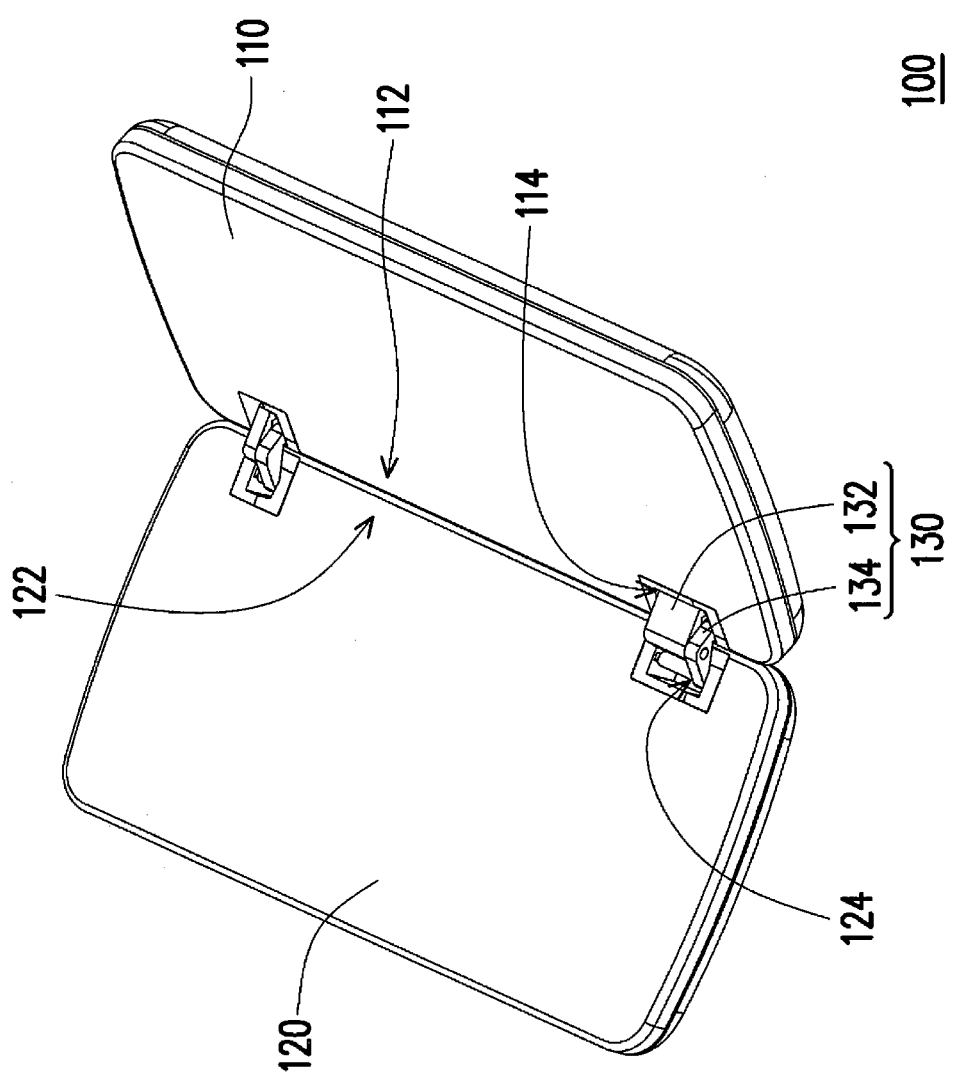
FIG. 1 is a three-dimensional diagram of a handheld electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a three-dimensional diagram of a handheld electronic device according to an embodiment of the present invention. Referring to FIG. 1, a handheld electronic device 100 of the embodiment includes a first body 110, a second body 120 and at least a pivot mechanism 130 (there are two pivot mechanisms shown in FIG. 1). A first side edge 112 of the first body 110 is adjacent to a second side edge of the second body 120, and a first accommodation space 114 and a second accommodation space 124 corresponding to the first accommodation space 114 are respectively disposed on the first side edge 112 and the second side edge 122. In the embodiment, the handheld electronic device 100 is, for example, a folded mobile phone, wherein the first body 110 has a display interface, for example, a screen; the second body 120 has an operation interface, for example, a real keypad or a virtual keypad. The virtual keypad herein is implemented by a keypad displayed on a touch screen for a user to operate. It should be noted that the present patent application is certainly not limited to the above-mentioned layout of the first body 110 and the second body 120. In fact, both the first body 110 and the second body 120 can respectively have a display interface or respectively have an operation interface, and the invented handheld electronic device can have a touching-mode input structure integrated into the handheld electronic device to meet different application requirements. In addition, the operation interface or the display interface can be disposed on a surface far away from the pivot mechanism 130, so that when a user operates the operation interface or the display interface, the user is not able to see the pivot mechanism 130; that is, both the operation interface and the display interface are located behind the first body 110 and the second body 120 as shown by FIG. 1.

Figure 2:
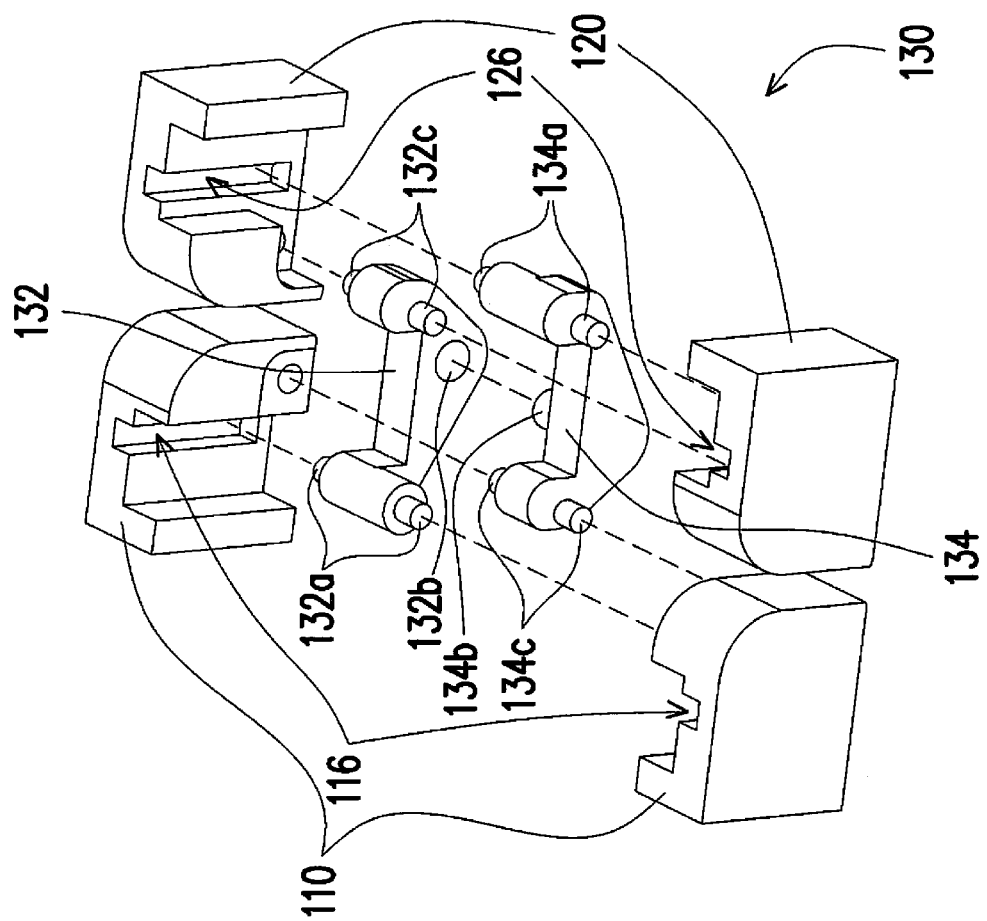
FIG. 2 is an exploded diagram of the assembled pivot mechanism of the handheld electronic device of FIG. 1.

FIG. 2 is an exploded diagram of the assembled pivot mechanism of the handheld electronic device of FIG. 1, wherein only a part of the first body 110, a part of the second body 120 and one of the two pivot mechanisms 130 are shown. Referring to FIGS. 1 and 2, a first groove 116 is disposed in the first accommodation space 114 and a second groove 126 is disposed in the second accommodation space 124. The pivot mechanism 130 is disposed in the first accommodation space 114 and the second accommodation space 124 and connected between the first body 110 and the second body 120.

The pivot mechanism 130 includes a first connecting rod 132 and a second connecting rod 134. The first connecting rod 132 has a first pivot part 132a, a second pivot part 132b and a third pivot part 132c, wherein the second pivot part 132b is located between the first pivot part 132a and the third pivot part 132c, the first pivot part 132a is slidably disposed on the first groove 116 and the third pivot part 132c is pivoted on the second body 120.

The second connecting rod 134 has a fourth pivot part 134a, a fifth pivot part 134b and a sixth pivot part 134c, wherein the fifth pivot part 134b is located between the fourth pivot part 134a and the sixth pivot part 134c and pivoted on the second pivot part 132b of the first connecting rod 132. The fourth pivot part 134a is slidably disposed on the second groove 126. The sixth pivot part 134c is pivoted on the first body 110 so that the first body 110 and the second body 120 are able to relatively swing between an opened state and a folded state. In more detail, when the handheld electronic device is opened up horizontally, the first body 110 and the second body 120 are horizontally side by side; when the handheld electronic device is folded, the first body 110 and the second body 120 are stacked (as shown by FIG. 3C).

Figure 3A:
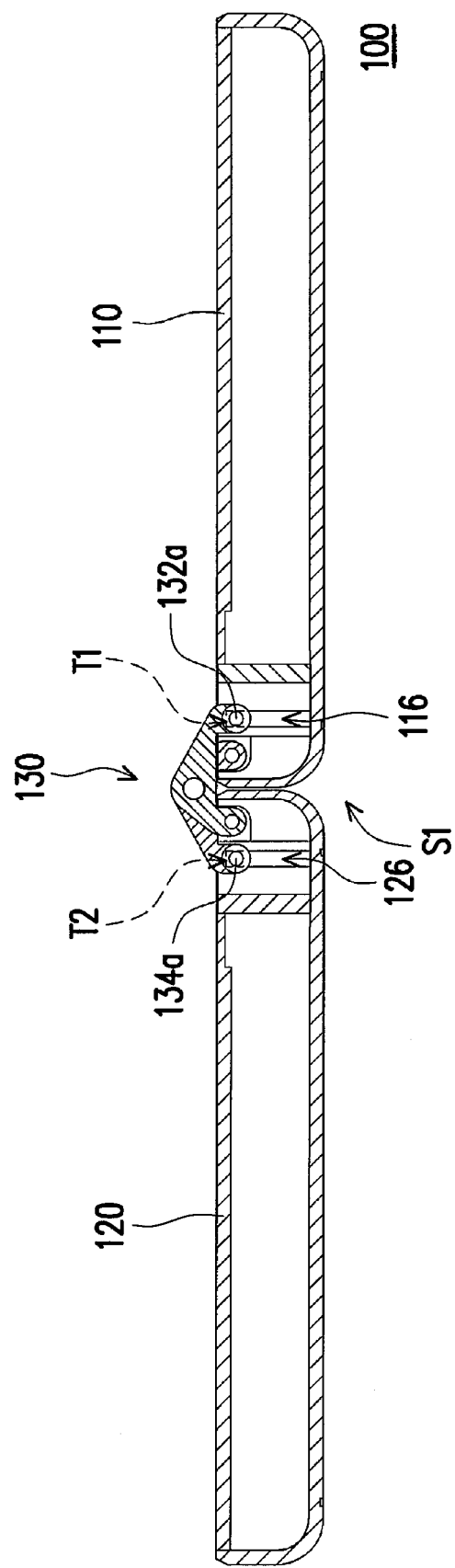
FIGS. 3A-3C are cross-sectional diagrams of the handheld electronic device of FIG. 1 showing an opening and closing course.
Figure 3B:
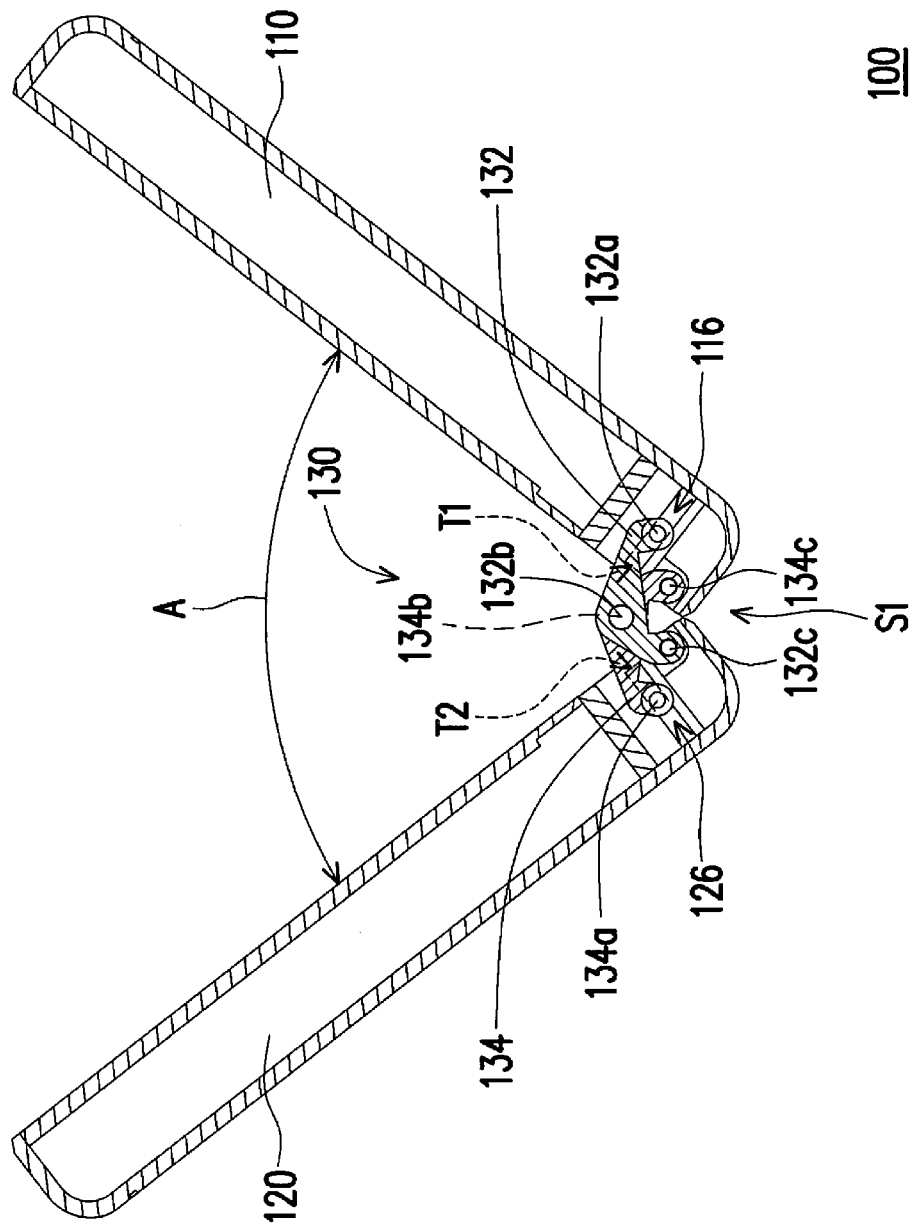
Figure 3C:
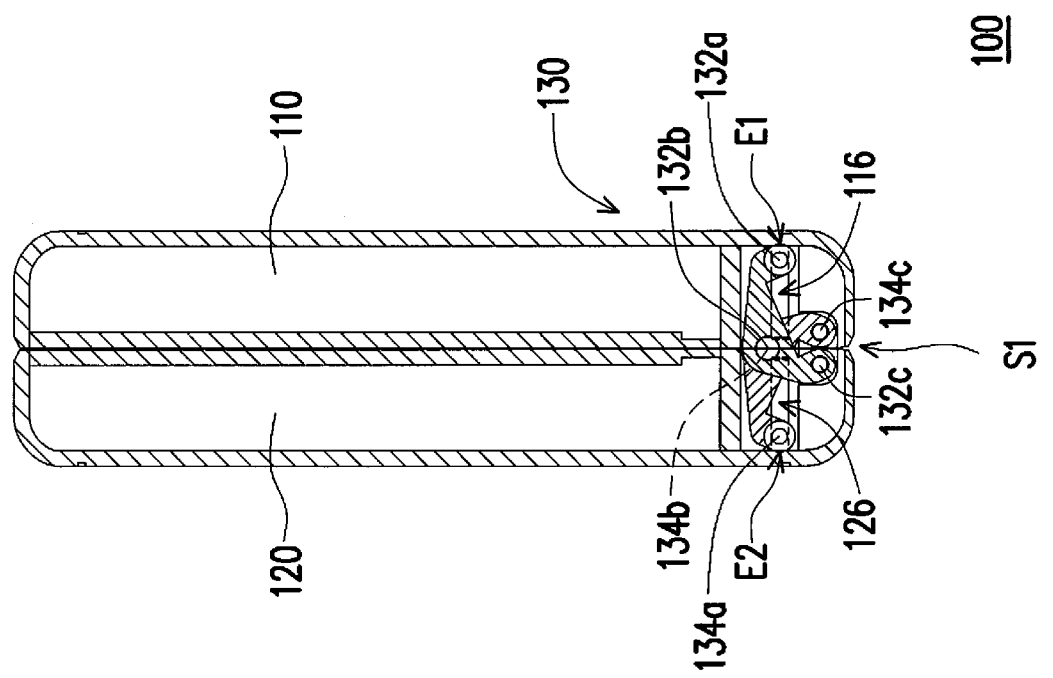

In order to describe the feature of the handheld electronic device 100 of the embodiment in more detail, an opening and closing course of the handheld electronic device 100 of the embodiment is explained in association with FIGS. 3A-3C.

FIGS. 3A-3C are cross-sectional diagrams of the handheld electronic device of FIG. 1 showing an opening and closing course. Referring to FIG. 3A, the first body 110 and the second body 120 of the handheld electronic device 100 are opened up horizontally with 180°. As shown by FIG. 3A, the first pivot part 132a and the fourth pivot part 134a of the pivot mechanism 130 respectively lean against a first end surface T1 of the first groove 116 and a second end surface T2 of the second groove 126 to restrain the maximum swinging range of the first body 110 and the second body 120. When the first connecting rod 132 and the second connecting rod 134 respectively have a larger length, the maximum opened angle can be greater than 180°; when the first connecting rod 132 and the second connecting rod 134 respectively have a smaller length, the maximum opened angle would be less than 180°. In other words, corresponding to the full opened state, the included angle between the first body 110 and the second body 120 is not limited to 180°; in fact, the included angle can be slightly greater than or slightly less than 180°.

Next, referring to FIG. 3B, the first body 110 and the second body 120 of the handheld electronic device 100 are relatively swung by means of the pivot mechanism 130 from the opened state into a semi-folded state with an included angle A. During the swinging, the first connecting rod 132 and the second connecting rod 134 are relatively swung by means of the second pivot part 132b and the fifth pivot part 134b, and accordingly, the first connecting rod 132 and the second connecting rod 134 respectively swing in relation to the second body 120 by means of the third pivot part 132c and in relation to the first body 110 by means of the sixth pivot part 134c. Meanwhile, the first pivot part 132a is sliding along the first groove 116 gradually departing from the first end surface T1, and the fourth pivot part 134a is sliding along the second groove 126 gradually departing from the second end surface T2.

Finally, referring to FIG. 3C, where the first body 110 and the second body 120 of the handheld electronic device 100 are swung from the semi-folded state with an included angle A into a folded state by means of the pivot mechanism 130. During the swinging, the first connecting rod 132 and the second connecting rod 134 further relatively swing by means of the second pivot part 132b and the fifth pivot part 134b, and accordingly, the first connecting rod 132 and the second connecting rod 134 respectively swing in relation to the second body 120 by means of the third pivot part 132c and in relation to the first body 110 by means of the sixth pivot part 134c. Meanwhile, the first pivot part 132a is further sliding along the first groove 116 and arrives at a first end E1 of the first groove 116, and the fourth pivot part 134a is further sliding along the second groove 126 and arrives at a second end E2 of the second groove 126.

It should be noted that in spite of the states, the pivot mechanism 130 would not be exposed at an outer side S1 of the handheld electronic device 100.

The following another embodiment is able to provide a handheld electronic device with a positioning effect when the first body and the second body have a specific included angle.

Figure 4:
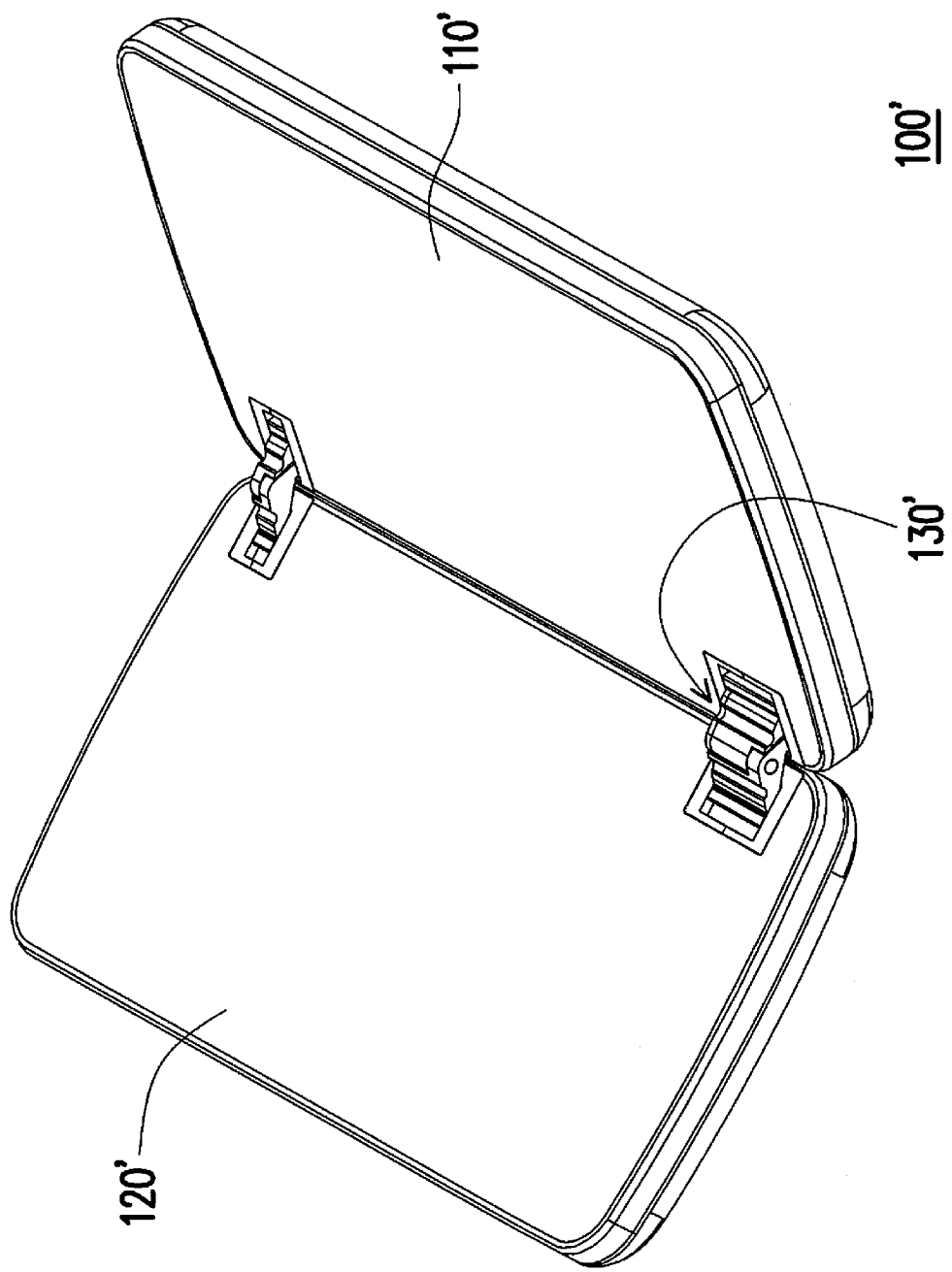
FIG. 4 is a three-dimensional diagram of a handheld electronic device according to another embodiment of the present invention.
Figure 5:
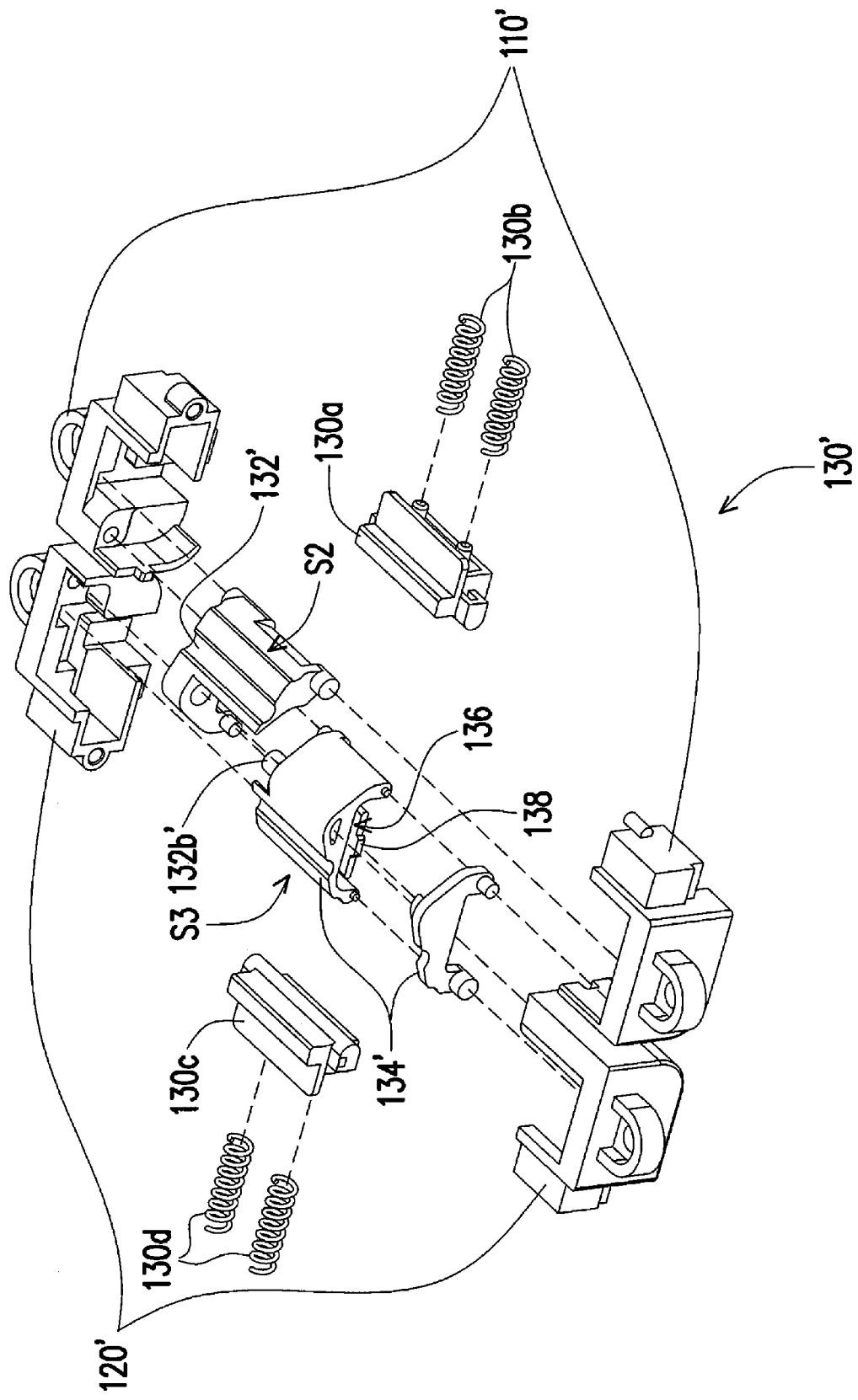
FIG. 5 is an exploded diagram of the assembled pivot mechanism of the handheld electronic device of FIG. 4.

FIG. 4 is a three-dimensional diagram of a handheld electronic device according to another embodiment of the present invention and FIG. 5 is an exploded diagram of the assembled pivot mechanism of the handheld electronic device of FIG. 4. In FIG. 5, only a part of the first body 110' of the handheld electronic device 100', a part of the second body 120' thereof and only one pivot mechanism 130' are shown. Referring to FIGS. 4 and 5, in comparison with the handheld electronic device 100 of FIG. 1, the pivot mechanism 130' of the handheld electronic device 100' of the embodiment further includes a first block 130a, at least a first elastic member 130b (there are two first elastic members 130b in FIG. 5), a second block 130c and at least a second elastic member 130d (there are two second elastic members 130d in FIG. 5), wherein each of the first elastic members 130b or each of the second elastic members 130d includes a spring.

Figure 6A:
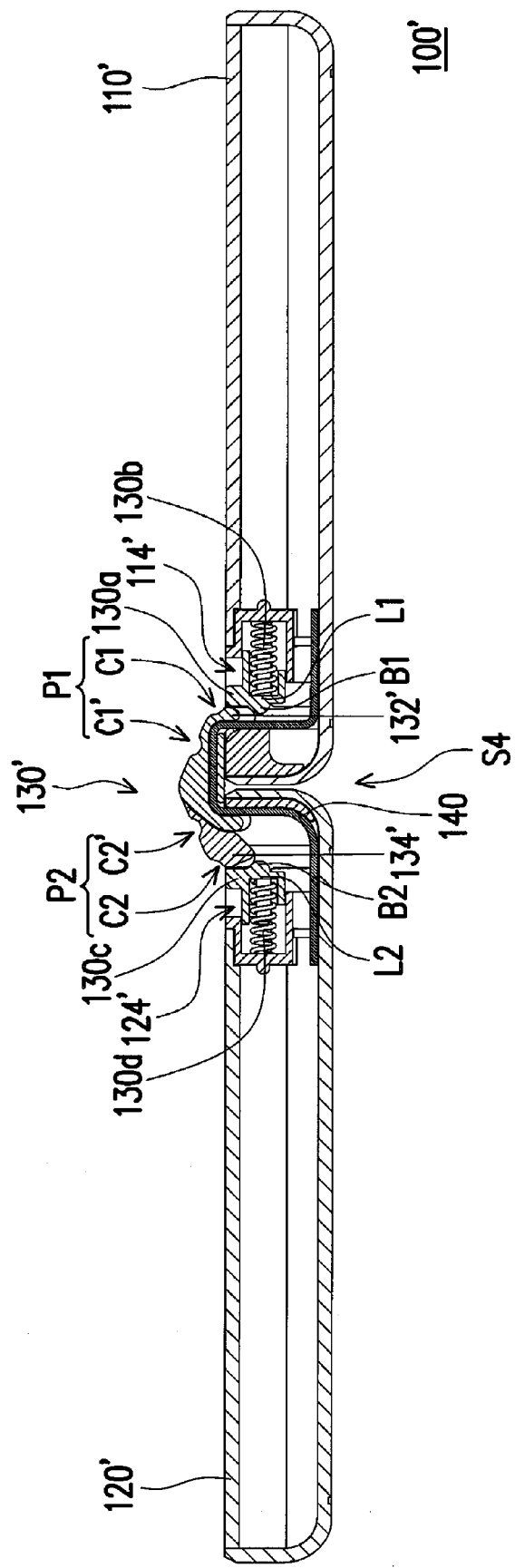
FIGS. 6A-6C are cross-sectional diagrams of the handheld electronic device of FIG. 4 showing an opening and closing course.
Figure 6B:
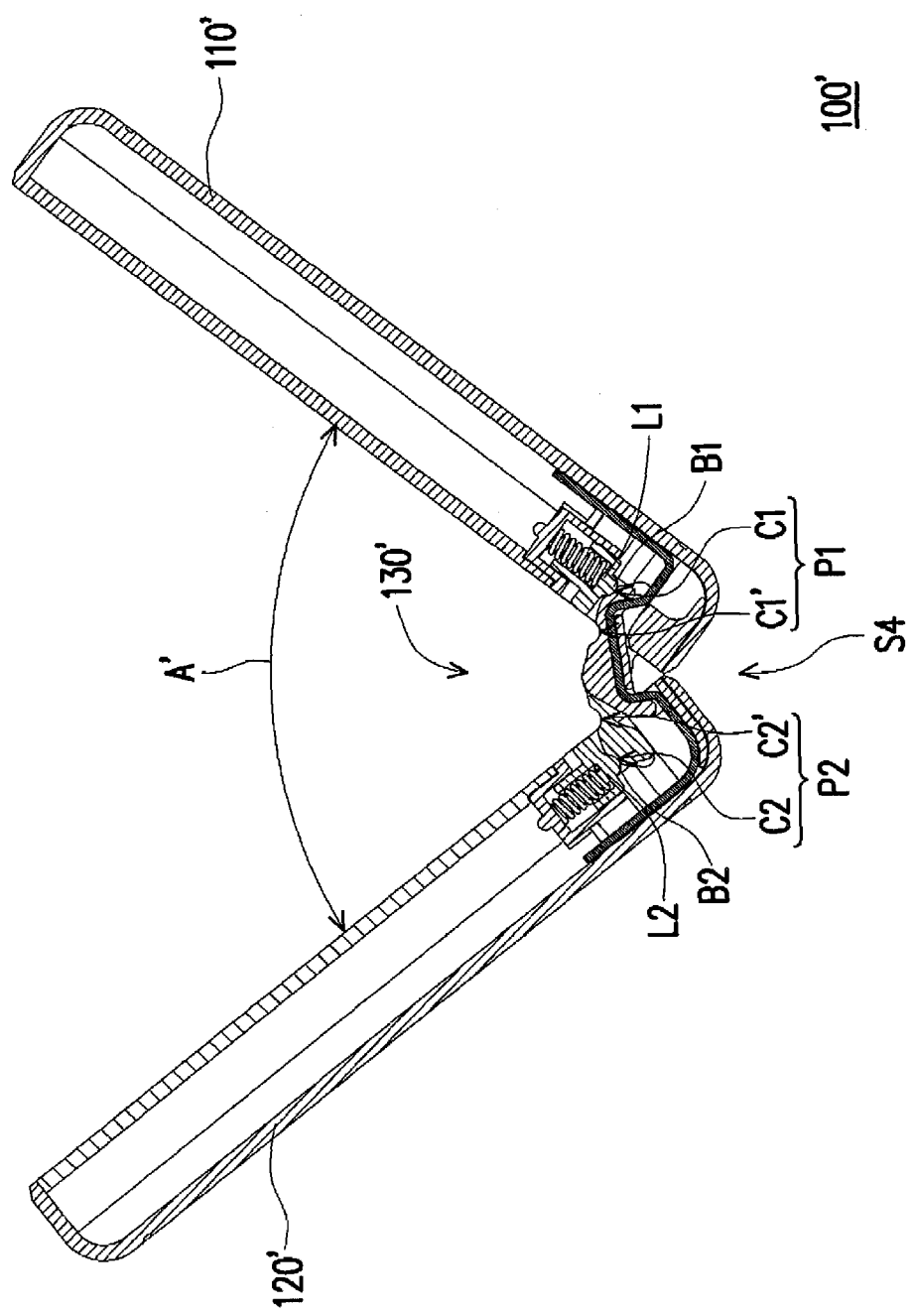
Figure 6C:
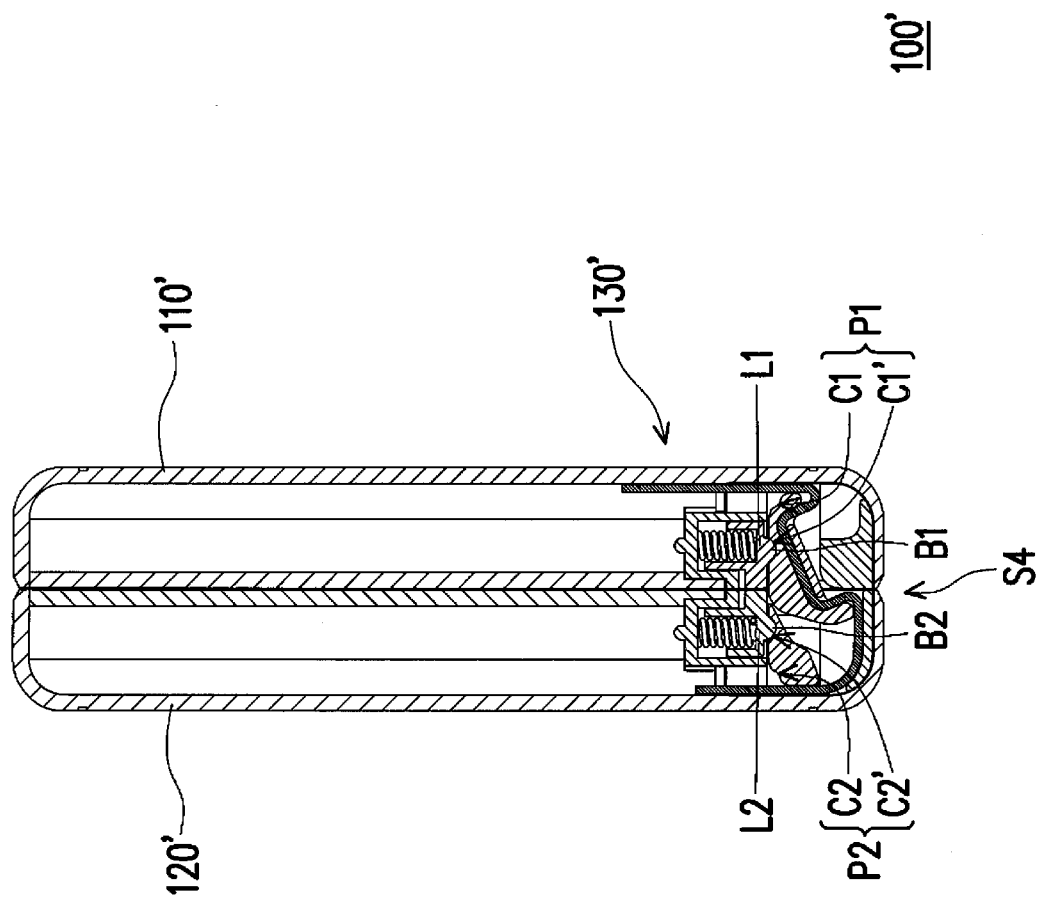

FIGS. 6A-6C are cross-sectional diagrams of the handheld electronic device of FIG. 4 showing an opening and closing course. Referring to FIGS. 5 and 6A, the first block 130a is disposed in the first accommodation space 114' and leaning against a first supporting surface S2 of the first connecting rod 132', wherein the first block 130a has a first supporting portion L1, and the first supporting surface S2 has a first positioning portion P1 matched with the first supporting portion L1. The first elastic members 130b are connected between the first block 130a and the first body 110'. The second block 130c is disposed in the second accommodation space 124' and leaning against a second supporting surface S3 of the second connecting rod 134', wherein the second block 130c has a second supporting portion L2, and the second supporting surface S3 has a second positioning portion P2 matched with the second supporting portion L2. The second elastic members 130d are connected between the second block 130c and the second body 120'.

In the embodiment, the first supporting portion L1 includes a first protrusion B1 and the first positioning portion P1 includes a plurality of first recesses C1, and each of the first recesses C1 and the first protrusion B1 are matched with each other. The second supporting portion L2 includes a second protrusion B2 and the second positioning portion P2 includes a plurality of second recesses C2, and each of the second recesses C2 and the second protrusion B2 are matched with each other. By means of the engagements between each of the first recesses C1 and the first protrusion B1 and the engagements between each of the second recesses C2 and the second protrusion B2, the design of the embodiment can provide the handheld electronic device with a positioning effect when the first body 110' and the second body 120' have a specific included angle. The present invention is not limited to the above-mentioned structure to produce a positioning effect. In fact, the present invention application allows any structures having a positioning effect by a match between the first supporting portion L1 and the first positioning portion P1 or a match between the second supporting portion L2 and the second positioning portion P2.

Referring to FIG. 6A, the handheld electronic device 100' in the embodiment further includes a flexible electrical connecting member 140 electrically connected between the first body 110' and the second body 120'. The flexible electrical connecting member 140 herein can be an FCB or a coaxial cable. Referring to FIG. 5, a channel for connecting member 136 is formed in the pivot mechanism 130' so that the flexible electrical connecting member 140 is able to go through the channel for connecting member 136 to connect the first body 110' and the second body 120'. The pivot mechanism 130' includes a tongue 138 disposed beside the second pivot part 132b' of the first connecting rod 132' to form the channel for connecting member 136 between the first connecting rod 132' and the tongue 138. However, the handheld electronic device 100' can also use blueteeth mode or other wireless transmission modes to realize an electrical connection between the first body 110' and the second body 120'.

In order to describe the feature of the handheld electronic device 100' of the embodiment in more detail, an opening and closing course of the handheld electronic device 100' of the embodiment is explained in association with FIGS. 6A-6C.

FIGS. 6A-6C are cross-sectional diagrams of the handheld electronic device of FIG. 1 showing an opening and closing course. Referring to FIG. 6A, the first body 110' and the second body 120' of the handheld electronic device 100' are opened up horizontally with 180°. Next referring to FIG. 6B, the first body 110' and the second body 120' of the handheld electronic device 100' are relatively swung by means of the pivot mechanism 130' from the opened state into a semi-folded state with an included angle A'. At the time, a first recess C1 of the first positioning portion P1 and the first protrusion B1 of the first supporting portion L1 are engaged with each other and a second recesses C2 of the second positioning portion P2 and the second protrusion B2 of the second supporting portion L2 are engaged with each other so as to produce a positioning effect.

Finally referring to FIG. 6C, where the first body 110' and the second body 120' of the handheld electronic device 100' are swung from the semi-folded state with a included angle A' into a folded state by means of the pivot mechanism 130'. During the swinging, another first recesses C1' of the first positioning portion P1 and the first protrusion B1 of the first supporting portion L1 are engaged with each other and another second recesses C2' of the second positioning portion P2 and the second protrusion B2 of the second supporting portion L2 are engaged with each other so as to produce a positioning effect. When the relative angle position between the first body 110' and the second body 120' is an included angle A', the handheld electronic device 100' is able to stand on a table surface so as to serve as an electronic album.

It should be noted that the opening and closing course of the handheld electronic device 100' shown by FIGS. 6A-6C is similar to that of the handheld electronic device 100 shown by FIGS. 3A-3C; therefore, the detail of the course of the handheld electronic device 100' is saved for simplicity.

It should be noted that in spite of the states, the pivot mechanism 130' would not be exposed at an outer side S4 of the handheld electronic device 100'. In particular, when the handheld electronic device 100' takes the above-mentioned semi-folded state or folded state, the first supporting portion L1 and the second supporting portion L2 are respectively matched with the first positioning portion P1 and the second positioning portion P2 to produce a positioning effect.

In summary, the handheld electronic device of the present invention application is able to make the pivot mechanism for connecting the first body to the second body hidden by the two bodies when the handheld electronic device is folded, so that the invented handheld electronic device has a symmetry figure, and the two bodies pivoted by each other can be located on a same plane when the handheld electronic device is opened up horizontally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
a first body, having a first side edge;
a second body, having a second side edge, wherein the second side edge is adjacent to the first side edge, the first side edge and the second side edge respectively have a first accommodation space and a second accommodation space corresponding to the first accommodation space, the first accommodation space is provided with a first groove formed therein and the second accommodation space is provided with a second groove formed therein; and
at least a pivot mechanism, disposed in the first accommodation space and the second accommodation space and connected between the first body and the second body; the pivot mechanism comprising:
a first connecting rod, having a first pivot part, a second pivot part and a third pivot part, wherein the second pivot part is located between the first pivot part and the third pivot part, the first pivot part is slidably disposed in the first groove and the third pivot part is pivoted on the second body; and
a second connecting rod, having a fourth pivot part, a fifth pivot part and a sixth pivot part, wherein the fifth pivot part is located between the fourth pivot part and the sixth pivot part and pivoted on the second pivot part of the first connecting rod, the fourth pivot part is slidably disposed in the second groove, and the sixth pivot part is pivoted on the first body so as to enable the first body and the second body to relatively swing between an opened state and a folded state by means of the pivot mechanism.

2. The handheld electronic device according to claim 1, wherein the first body and the second body are substantially coplanar at the opened state.

3. The handheld electronic device according to claim 1, wherein the pivot mechanism is wrapped in the first body and the second body at the folded state.

4. The handheld electronic device according to claim 1, wherein the pivot mechanism further comprises:

a first block, disposed in the first accommodation space and leaning against a first supporting surface of the first connecting rod, wherein the first block has a first supporting portion, and the first supporting surface has a first positioning portion matched with the first supporting portion;

a first elastic member, connected between the first block and the first body;

a second block, disposed in the second accommodation space and leaning against a second supporting surface of the second connecting rod, wherein the second block has a second supporting portion, and the second supporting surface has a second positioning portion matched with the second supporting portion; and a second elastic member, connected between the second block and the second body.

5. The handheld electronic device according to claim 4, wherein the first supporting portion comprises a first protrusion, the first positioning portion has a plurality of first recesses, and each of the first recesses and the first protrusion are matched with each other.

6. The handheld electronic device according to claim 5, wherein the second supporting portion comprises a second protrusion, the second positioning portion has a plurality of second recesses, and each of the second recesses and the second protrusion are matched with each other.

7. The handheld electronic device according to claim 4, wherein the first elastic member or the second elastic member comprises a spring.

8. The handheld electronic device according to claim 1, further comprising a flexible electrical connecting member electrically connected between the first body and the second body.

9. The handheld electronic device according to claim 8, wherein the flexible electrical connecting member comprises a flexible circuit board or a coaxial cable.

10. The handheld electronic device according to claim 8, wherein the pivot mechanism has a channel and the flexible electrical connecting member is connected between the first body and the second body through the channel.

11. The handheld electronic device according to claim 10, wherein the pivot mechanism comprises a tongue disposed beside the second pivot part of the first connecting rod so as to form the channel.

12. The handheld electronic device according to claim 1, wherein the first body has a display interface and the second body has an operation interface.

13. The handheld electronic device according to claim 12, wherein the display interface comprises a screen.

14. The handheld electronic device according to claim 12, wherein the operation interface comprises a real keypad or a virtual keypad.

* * * * *